(12) United States Patent
Yoon et al.

(10) Patent No.: US 9,384,574 B2
(45) Date of Patent: Jul. 5, 2016

(54) IMAGE PROCESSING METHOD AND APPARATUS THEREFOR

(71) Applicant: SAMSUNG ELECTRONICS CO., LTD., Suwon-si (KR)

(72) Inventors: Jong-chul Yoon, Seoul (KR); Soo-wan Park, Suwon-si (KR); Seung-ho Shin, Suwon-si (KR); Joon-seok Lee, Suwon-si (KR); Tae-kwon Jang, Seoul (KR); Kang-sik Choi, Yongin-si (KR); In-cheol Park, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 14/477,314

(22) Filed: Sep. 4, 2014

(65) Prior Publication Data

US 2015/0062128 A1    Mar. 5, 2015

Related U.S. Application Data

(60) Provisional application No. 61/873,558, filed on Sep. 4, 2013, provisional application No. 61/873,531, filed on Sep. 4, 2013.

(30) Foreign Application Priority Data

May 14, 2014   (KR) ........................ 10-2014-0057950

(51) Int. Cl.
*G09G 5/00* (2006.01)
*G06T 11/40* (2006.01)
*G06T 11/00* (2006.01)
(Continued)

(52) U.S. Cl.
CPC ............... *G06T 11/40* (2013.01); *G06T 11/001* (2013.01); *G06T 13/60* (2013.01); *G06T 13/80* (2013.01); *G06T 2210/24* (2013.01)

(58) Field of Classification Search
USPC ......................................................... 345/581
See application file for complete search history.

(56) References Cited

U.S. PATENT DOCUMENTS 6,903,741 B2   6/2005 Corbetta
8,055,490 B2   11/2011 Kim et al.
(Continued)

FOREIGN PATENT DOCUMENTS

EP   2 144 200 A1   1/2010
JP   2004-334550 A   11/2004
(Continued)

OTHER PUBLICATIONS

Communication issued on Jun. 29, 2015 by the Korean Intellectual Property Office in related Application No. 10-2014-0057950.
(Continued)

*Primary Examiner* — Ryan R Yang
(74) *Attorney, Agent, or Firm* — Sughrue Mion, PLLC

(57) ABSTRACT

Provided is an image processing method. The image processing method includes obtaining at least one stencil mask region for a current frame, obtaining a first velocity field corresponding to a radial spreading from a central point of the at least one stencil mask region, obtaining a final velocity field for the at least one stencil mask region based on the first velocity field, determining a pixel value included in the at least one stencil mask region based on the obtained final velocity field, and displaying the current frame according to the determined pixel value.

20 Claims, 10 Drawing Sheets

(51) Int. Cl.
*G06T 13/60* (2011.01)
*G06T 13/80* (2011.01)

(56) References Cited

U.S. PATENT DOCUMENTS

| | | | |
|---|---|---|---|
| 8,335,675 B1* | 12/2012 | DiVerdi | G06T 13/80 |
| | | | 434/81 |
| 8,411,919 B2 | 4/2013 | Kiraly et al. | |
| 2008/0001963 A1* | 1/2008 | Lefebvre | G06T 11/001 |
| | | | 345/582 |
| 2009/0267951 A1* | 10/2009 | Chang | G06T 13/60 |
| | | | 345/474 |
| 2011/0307837 A1* | 12/2011 | Cohen | G06T 13/60 |
| | | | 715/851 |

FOREIGN PATENT DOCUMENTS

| | | |
|---|---|---|
| JP | 2004-334694 A | 11/2004 |
| JP | 2007-293526 A | 11/2007 |
| KR | 10-2010-0138073 A | 12/2010 |

OTHER PUBLICATIONS

Communication issued on Oct. 30, 2015, by the Korean Intellectual Property Office in counterpart Application No. 10-2014-0057950.

* cited by examiner

TRACING OF
PREVIOUS POSITION

COLOR
INTERPOLATION

DETERMINATION
OF PIXEL VALUE

IMAGE PROCESSING METHOD AND APPARATUS THEREFOR

CROSS-REFERENCE TO RELATED APPLICATIONS

This application claims priority from Korean Patent Application No. 10-2014-0057950, filed on May 14, 2014 in the Korean Intellectual Property Office, U.S. Provisional Application No. 61/873,531, filed on Sep. 4, 2013 in the United States Patent and Trademark Office, and U.S. Provisional Application No. 61/873,558, filed on Sep. 4, 2013 in the United States Patent and Trademark Office, the disclosures of which are incorporated herein in their entirety by reference.

BACKGROUND

1. Field

Apparatuses and methods consistent with exemplary embodiments relate to an image processing method and an apparatus therefor.

2. Description of the Related Art

Flow of fluid may be mainly considered as incompressible fluid flow, for example, flow of liquid. In the fields of computer graphics (CG) and computational fluid dynamics (CFD), the Navier-Stokes equation is used for analyzing the incompressible fluid flow. In the Navier-Stokes equation, since various partial differential equations are combined into one equation, analytic solution may not be provided.

A related art image processing apparatus divides a fluid calculation region into grid finite elements, and performs the Navier-Stokes equation on each frame to calculate a velocity field of a grid, thereby implementing a fluid simulation based on time. However, performing the Navier-Stokes equation requires a large number of calculations.

SUMMARY

One or more exemplary embodiments provide an image processing method and an apparatus therefor. In detail, in an image processing method and an apparatus therefor, an image is processed to have a visual effect of a fluid simulation according to an input signal.

Additional aspects will be set forth in part in the description which follows and, in part, will be apparent from the description, or may be learned by practice of the exemplary embodiments.

According to an aspect of an exemplary embodiment, an image processing method includes: obtaining at least one stencil mask region for a current frame; obtaining a first velocity field corresponding to a radial spreading spread from a central point of the at least one stencil mask region in the at least one stencil mask region; obtaining a final velocity field for the at least one stencil mask region based on the first velocity field; determining a pixel value included in the at least one stencil mask region based on the obtained final velocity field; and displaying the current frame according to the determined pixel value.

The obtaining a final velocity field may include: obtaining a second velocity field from a certain image; and obtaining the final velocity field for the at least one stencil mask region based on the first velocity field and the second velocity field.

The certain image may be a noise image, and the obtaining of a second velocity field may include obtaining the second velocity field by performing a curl operation on the noise image.

The obtaining at least one stencil mask region may include determining a size of the at least one stencil mask region according to a difference between a time when an input is received and a time when the current frame is displayed.

The determining of a pixel value may include: obtaining a velocity vector from the final velocity field; determining a pixel value of a previous position based on the obtained velocity vector; and determining the pixel value based on the determined pixel value of the previous position.

The obtaining at least one stencil mask region may include: when a stencil mask region for a previous frame exists, obtaining a display time of the stencil mask region for the previous frame; and when the display time is shorter than a reference time, obtaining the stencil mask region for the previous frame as the at least one stencil mask region for the current frame.

The obtaining of the at least one stencil mask region may include erasing information about the stencil mask region for the previous frame from a memory when the display time is equal to or longer than the reference time.

The displaying of the current frame may include: increasing, to a certain size or more, at least one from among chroma and brightness of the determined pixel value; and displaying the current frame according to the pixel value of which the at least one from among the chroma and the brightness increases.

According to an aspect of another exemplary embodiment, a terminal apparatus includes: a controller configured to obtain at least one stencil mask region for a current frame, obtain a first velocity field corresponding to a radial spreading from a central point of the at least one stencil mask region in the at least one stencil mask region, obtain a final velocity field for the at least one stencil mask region based on the first velocity field, and determine a pixel value included in the at least one stencil mask region based on the obtained final velocity field; and a display configured to display the current frame according to the determined pixel value.

According to an aspect of another exemplary embodiment, an apparatus for processing an image includes: at least one memory operable to store program code; at least one processor operable to read the program code and operate as instructed by the program code, wherein the program code is configured to cause the at least one processor to: obtain a radial vector with respect to a point corresponding to a user input; obtain a previous position of a pixel at a previous frame based on the radial vector; and determine a pixel value of the pixel at a current frame based on a pixel value at the previous position of the pixel.

According to an aspect of another exemplary embodiment, provided is a computer-readable recording medium having recorded thereon a program for executing the above method.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
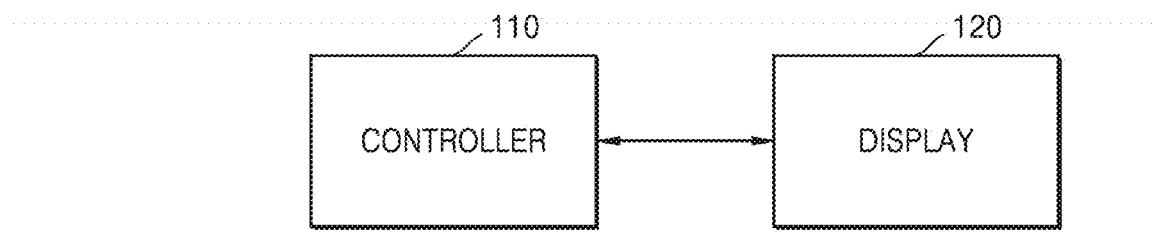
FIG. 1 is a block diagram illustrating an internal configuration of a terminal apparatus according to an exemplary embodiment.

Reference will now be made in detail to exemplary embodiments with reference to the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, the exemplary embodiments will be described in detail with reference to the accompanying drawings. In the following description, when the detailed description of the relevant known function or configuration is determined to unnecessarily obscure the important point, the detailed description will be omitted. Like reference numerals refer to like elements throughout.

The terms or words used in the present specification and claims, limited to common or dictionary meaning is not to be construed terms appropriately for the best explanation of his own inventive concept, the inventor should be interpreted based on the meanings and concepts corresponding to technical aspects may be defined on the basis of the principle. Therefore, the configuration shown in the drawings embodiments described herein, nothing but the exemplary embodiments only, does not represent all of the technical idea, as in effect at the time of this application, the configuration may be replaced, it should be understood that there may be various equivalents and a modified example.

In the drawings, some elements may be exaggerated, omitted, or schematically illustrated. In addition, the size of each element may not fully reflect the actual size. The exemplary embodiments are not limited by a relative size or interval which is illustrated in the drawings.

In this disclosure below, when it is described that one comprises (or includes or has) some elements, it should be understood that it may comprise (or include or have) only those elements, or it may comprise (or include or have) other elements as well as those elements if there is no specific limitation. Moreover, each of terms such as ". . . unit", ". . . apparatus" and "module" described in the specification denotes an element for performing at least one function or operation, and may be implemented in hardware, software or the combination of hardware and software.

Hereinafter, the exemplary embodiments will be described in detail to be easily embodied by those of ordinary skill in the art with reference to the accompanying drawings. The exemplary embodiment may, however, be embodied in many different forms and should not be construed as being limited to the embodiments set forth herein. In the accompanying drawings, a portion irrelevant to a description of the exemplary embodiment will be omitted for clarity. Moreover, like reference numerals refer to like elements throughout.

FIG. 1 is a block diagram illustrating an internal configuration of a terminal apparatus 100 according to an exemplary embodiment.

The terminal apparatus 100 according to an exemplary embodiment may process an image displayed by a display 120, which is described below, according to an input signal, and display the processed image. In detail, the terminal apparatus 100 may process and display a corresponding image according to an input signal for applying a visual effect to the image. For example, the terminal apparatus 100 may process an image according to an input signal for applying a watercolor effect, which simulates flowing fluid. When the watercolor effect is applied to an image, colors of some regions of the image may appear to be mixed with fluid (e.g., water), and thus, the image may be displayed as if the image moves like flowing fluid.

The terminal apparatus 100 may process an image for each frame, and may sequentially display the processed images. A pixel value of a current frame may be determined based on a pixel value of a previous frame. The frame may include each of stationary images which are sequentially displayed over time and thus compose a moving image.

In particular, the terminal apparatus 100 may set a stencil mask region of a displayed image according to an input signal, and process pixels included in the set stencil mask region. The stencil mask region may include a region for applying the watercolor effect according to the input signal. The stencil mask region may be generated according to the input signal, and a size of the stencil mask region may be changed as time passes. For example, the stencil mask region may be increasingly enlarged with respect to a point at which the input signal is generated, with the passing of time. Therefore, the terminal apparatus 100 may process only pixel values included in the stencil mask region instead of a whole region of the image, thereby reducing a load for processing the image.

The terminal apparatus 100 may process the image to display a flow of fluid by using a velocity field obtained from another image and a velocity field which is obtained according to an input signal. Thus, a watercolor effect may be applied to a region included in the stencil mask image according to the input signal. In the related art, the Navier-Stokes equation requiring a large number of calculations may be used for simulating fluid flow. On the other hand, the terminal apparatus 100 according to an exemplary embodiment may obtain a velocity field for simulating the fluid flow without using the Navier-Stokes equation. That is, the terminal apparatus 100 may reduce the number of calculations by using at least one from among a velocity field obtained from another image and a velocity field which is obtained according to the input signal, without using the above-described Navier-Stokes equation.

Incompressible fluid is fluid whose density is maintained without any change in fluid flow. Generally, gas may be classified as compressible fluid, and liquid may be classified as incompressible fluid. In an exemplary embodiment, in displaying an image with a flowing liquid simulation by applying the watercolor effect thereto, the terminal apparatus 100 may use a velocity field, having a characteristic of incompressible fluid, for processing the image. The terminal apparatus 100 may express a visual effect, in which fluid flows according to an input signal, by using a pre-obtained velocity field having the characteristic of the incompressible fluid instead of obtaining a velocity through fluid simulation according to the Navier-Stokes equation.

Moreover, an image may be processed by a velocity field based on an input signal to display an image which is changed according to the input signal. The velocity field which is obtained according to the input signal may be, for example, a velocity field having a vector value corresponding to a radial spreading with respect to a point at which the input signal is generated.

The terminal apparatus 100 may calculate a final velocity field by using at least one from among the above-described velocity fields, and advect each pixel according to the final velocity field to determine each pixel value. Advection refers to movement of a flow of fluid, and in detail, the terminal apparatus 100 may determine each pixel value by using a flow of fluid based on the final velocity field.

Referring to FIG. 1, the terminal apparatus 100 according to an exemplary embodiment may include a controller 110 and a display 120.

The controller 110 may control an overall operation of the display 120. In detail, the controller 110 may determine a stencil mask region of a current frame and a final velocity field of the stencil mask region, and determine pixel values included in the stencil mask region based on the final velocity field. Each of the pixel values may be determined according to an equation for expressing a flow of fluid based on the final velocity field. The controller 110 may control the display 120 to display a current frame according to the determined pixel value, thereby displaying an image with the watercolor effect applied thereto.

The display 120 may display the current frame according to control by the controller 110. In detail, the display 120 may time-serially display frames of an image of which at least one pixel value is determined by the controller 110. That is, the display 120 may time-serially display frames to which the watercolor effect is applied by the controller 110.

Hereinafter, for example, a detailed configuration of the terminal apparatus 100 will be described with reference to FIGS. 2 and 3.

Figure 2:
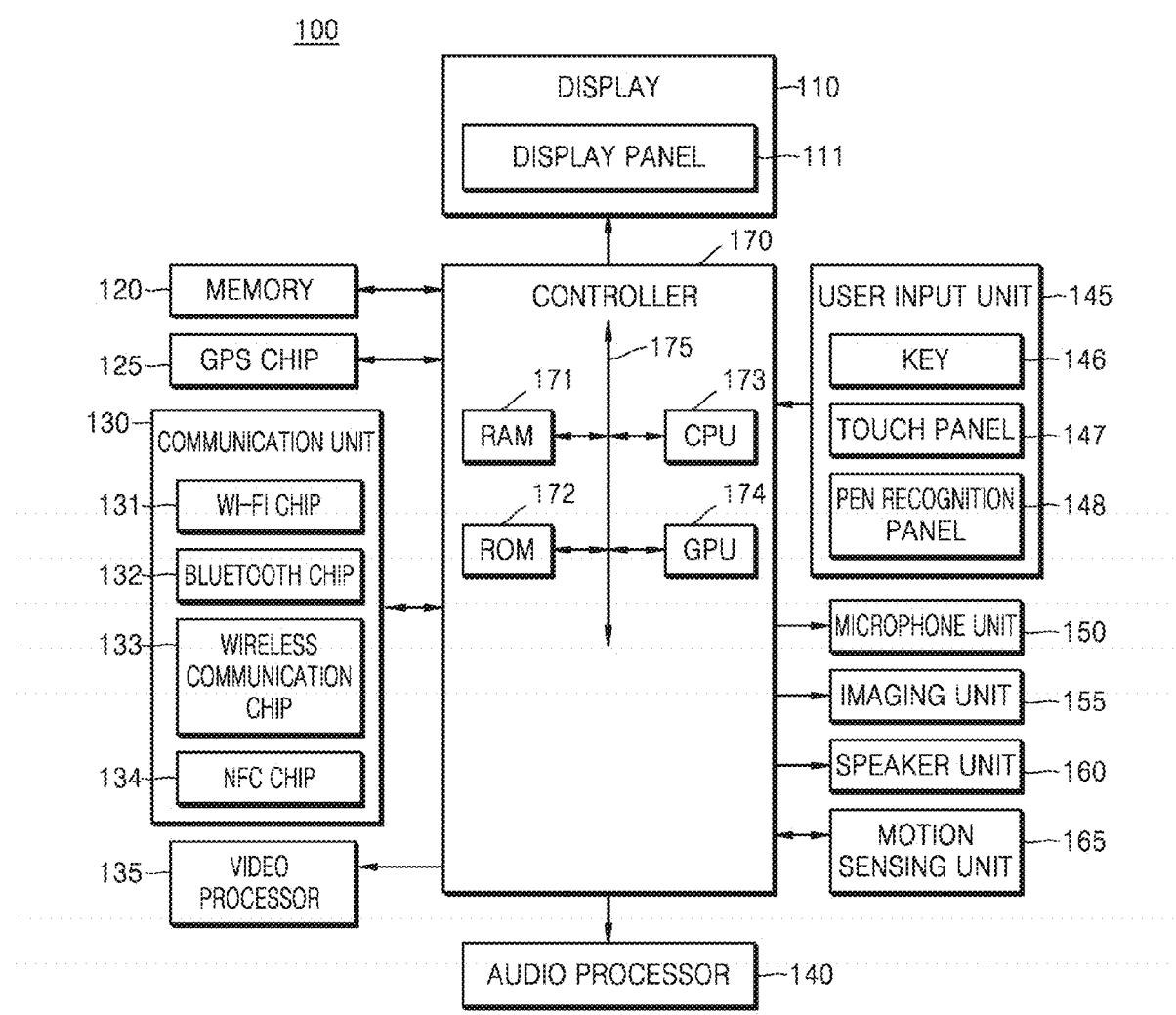
FIG. 2 is a block diagram illustrating an internal configuration of a terminal apparatus according to an exemplary embodiment.

FIG. 2 is a block diagram illustrating an internal configuration of a terminal apparatus 100 according to an exemplary embodiment. A controller 170 and a display 110 of FIG. 2 may respectively correspond to the controller 110 and the display 120 of FIG. 1.

A configuration of the terminal apparatus 100 illustrated in FIG. 2 may be applied to, for example, various types of devices such as portable terminals, tablet personal computers (PCs), personal digital assistants (PDAs), MP3 players, kiosks, electronic picture frames, navigation devices, digital televisions (TVs), smart TVs, and wearable devices such as wrist watches and head-mounted displays (HMDs).

Referring to FIG. 2, the terminal apparatus 100 may include at least one from among the display 110, the controller 170, a memory 120, a global positioning system (GPS) chip 125, a communication unit 130, a video processor 135, an audio processor 140, a user input unit 145, a microphone unit 150, an imaging unit 155, a speaker unit 160, and a motion sensor 165. The controller 170 and the display 110 of FIG. 2 may respectively correspond to the controller 110 and the display 120 of FIG. 1.

Referring to FIG. 2, the display 110 may include a display panel 111 and a controller (not shown) that controls the display panel 111. The display panel 111 may be implemented as various types of displays such as a liquid crystal display (LCD), an organic light-emitting diode (OLED) display, an active-matrix organic light-emitting diode (AM-OLED) display, and a plasma display panel (PDP). The display panel 111 may be implemented to be, for example, flexible, transparent, or wearable. The display 110 may be provided as a touch screen (not shown) in combination with a touch panel 147 of the user input unit 145. For example, the touch screen (not shown) may include an integrated module in which the display panel 111 and the touch panel 147 are combined with each other in a stacked structure.

The display 110 according to an exemplary embodiment may sequentially display frames to which the watercolor effect is applied by the controller 170.

The memory 120 may include at least one from among an internal memory (not shown) and an external memory (not shown).

The internal memory, for example, may include at least one from among a volatile memory (for example, a dynamic random access memory (DRAM), a static RAM (SRAM), a synchronous dynamic RAM (SDRAM), etc.), a nonvolatile memory (for example, a one time programmable read only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid state drive (SSD). According to an embodiment, the controller 170 may load a command or data, received from a nonvolatile memory or another element, into a volatile memory, and process the loaded command or data. Also, the controller 170 may store data, received from or generated by another element, in a nonvolatile memory.

The external memory, for example, may include at least one from among a compact flash (CF) card, a secure digital (SD) card, a micro-SD card, a mini-SD card, an extreme digital (xD) card, and a memory stick.

The memory 120 may store various programs and pieces of data, which are used for operating the terminal apparatus 100. For example, the memory 120 may store a program for performing image processing.

The controller 170 may control the display 110 to display image stored in the memory 120. When a user gesture is detected in one region of the display 110, the controller 170 may perform a control operation corresponding to the user gesture. For example, the controller 170 may process the region of the image corresponding to the user gesture, and control the display 110 to display the processed image.

The controller 170 may include at least one from among a RAM 171, a ROM 172, a central processing unit (CPU) 173, a graphic processing unit (GPU) 174, and a bus 175. The RAM 171, the ROM 172, the CPU 173, and the GPU 174 may be connected to one another through the bus 175.

The CPU 173 accesses the memory 120, and performs booting by using an operating system (OS) stored in the memory 120. The CPU 173 performs various operations by using various programs, content, and data, which are stored in the memory 120.

A command set for system booting may be stored in the ROM 172. For example, in the terminal apparatus 100, when a turn-on command is input and thus power is supplied, the CPU 173 may copy the OS to the memory 120 according to a command stored in the ROM 172, and execute the OS to boot a system. When the booting is completed, the CPU 173 copies various programs, stored in the memory 120, to the RAM 171, and executes the programs copied to the RAM 171 to perform various operations. When booting of the terminal apparatus 100 is completed, the CPU 173 displays a user interface (UI) screen in a region of the display 110. In detail, the GPU 174 may generate a screen on which various objects such as content, an icon, and a menu, is displayed. The GPU 174 calculates attribute values such as a coordinate value, a shape, a size, and a color of each of displayed objects according to a layout of a screen. The GPU 174 may generate a screen which has various layouts and includes an object, based on the calculated attribute values. The screen generated by the GPU 174 may be supplied to the display 110, and may be displayed in a region of the display 110.

The GPS chip 125 may receive a GPS signal from a GPS satellite to calculate a current position of the terminal apparatus 100. The controller 170 may calculate a user position by using the GPS chip 125 when a navigation program is used or a current position of the user is needed.

The communication unit 130 may communicate with various types of external devices according to various types of communication schemes. The communication unit 130 may include at least one from among a Wi-Fi chip 131, a Bluetooth chip 132, a wireless communication chip 133, and a near field communication (NFC) chip 134. The controller 170 may communicate with various external devices by using the communication unit 130.

The Wi-Fi chip 131 may perform communication in a Wi-Fi scheme, and the Bluetooth chip 132 may perform communication in a Bluetooth scheme. When using the Wi-Fi chip 131 or the Bluetooth chip 132, various pieces of connection information such as a service set identifier (SSID) and a session key may be first transmitted or received, a communication connection may be made by using the connection information, and various pieces of information may be transmitted or received through the communication connection. The wireless communication chip 133 may include a chip that performs communication according to various communication protocols such as IEEE, 3rd generation (3G), 3rd generation partnership project (3GPP), and long term evolution (LTE). The NFC chip 134 may include a chip that operates in an NFC scheme using a frequency band of 13.56 MHz among various FR-ID frequency bands such as 135 kHz, 13.56 MHz, 433 MHz, 860 to 960 MHz, and 2.45 GHz.

The video processor 135 may process video data which is included in content received through the communication unit 130 or content stored in the memory 120. The video processor 135 may perform various image processing such as decoding, scaling, noise filtering, frame rate conversion, and resolution conversion of the video data.

The audio processor 140 may process audio data which is included in the content received through the communication unit 130 or the content stored in the memory 120. The audio processor 140 may perform various processing such as decoding, amplifying, and noise filtering of the audio data.

When a reproduction program for multimedia content is executed, the controller 170 may drive the video processor 135 and the audio processor 140 to reproduce the multimedia content. The speaker unit 160 may output audio data generated by the audio processor 140.

The user input unit 145 may receive various commands from a user. The user input unit 145 may include at least one from among a key 146, a touch panel 147, and a pen recognition panel 148. According to an exemplary embodiment, a stencil mask region and a velocity field obtained based on a user input may be determined with respect to a point at which the user input is received in the display 110, and pixel values may be determined based on the determined stencil mask region and velocity field. Accordingly, images with the watercolor effect applied thereto may be displayed.

The key 146 may include various types of keys such as a mechanical button, a wheel, etc. which are respectively provided in various regions such as a front portion, a side portion, and a rear portion of a body thereof.

The touch panel 147 may sense a user's touch input, and output a touch event value corresponding to a sensed touch signal. When the touch panel 147 is combined with the display panel 111 to configure a touch screen (not shown), the touch screen may be implemented with various types of touch sensors such as a capacitive touch sensor, a pressure sensitive touch sensor, and a piezoelectric touch sensor. A capacitive type touch sensor is of a type in which when a part of a user's body touches a surface of a touch screen, a small amount of voltage applied by the user's body is sensed by using a dielectric coated on the surface of the touch screen, and touch coordinates are calculated based thereon. A pressure sensitive type touch sensor is of a type in which two electrode plates built into a touch screen are provided, and when a user touches a screen, a current flows due to contact between upper and lower electrode plates with respect to a touched position, and touch coordinates are calculated by sensing the current. A touch event which occurs in a touch screen may be, for example, generated by a user's finger, or generated by an object comprising a conductive material which enables a capacitance to be changed. However, exemplary embodiments are not limited thereto, and various other methods may be used to generate a touch event.

The pen recognition panel 148 may sense a proximity input or a touch input of a pen including a touch pen (for example, a stylus pen) or a digitizer pen by a user, and output a sensed pen proximity event or pen touch event signal. The pen recognition panel 148, for example, may be implemented in an electro-magnetic resonance (EMR) scheme, and may sense a touch input or a proximity input according to an intensity change of an electric field which is caused by a proximity input or a touch input of a pen. In detail, the pen recognition panel 148 may include an electronic signal processor (not shown) that sequentially provides an alternating current (AC) signal having a certain frequency to an electronic induction coil sensor (not shown) having a grid structure and loop coils of the electronic induction coil sensor. When a pen with a built-in resonance circuit is located near a loop coil of the pen recognition panel 148, a magnetic field transmitted from the loop coil generates a current, based on mutual electronic induction, in the resonance circuit of the pen. An induction magnetic field is generated from a coil included in the resonance circuit of the pen, and the pen recognition panel 148 may detect the induction magnetic field from the loop coil thereof, which is in a signal reception state. Accordingly, the pen recognition panel 148 senses a proximity input position or touch position of the pen. The pen recognition panel 148 may be provided at a certain region (for example, a region which covers a display region of the display panel 111) under the display panel 111.

The microphone unit 150 may receive a voice (e.g., a user voice), and convert the received voice into audio data. The controller 170 may use a user voice, which is input through the microphone unit 150, in a voice recognizing operation. Alternatively, the controller 170 may convert the user voice into audio data, and store the audio data in the memory 120.

The imaging unit 155 may capture a still image or a moving image according to control by the user. The imaging unit 155 may comprise a plurality of cameras such as a front camera and a rear camera.

When the imaging unit 155 and the microphone unit 150 are provided, the controller 170 may perform a control operation according to a user voice, which is input through the microphone unit 150, and a user motion recognized by the imaging unit 155. For example, the terminal apparatus 100 may operate in a motion control mode or a voice control mode. When the terminal apparatus 100 operates in the motion control mode, the controller 170 may activate the imaging unit 155 to photograph the user, trace a motion change of the user, and perform a control operation corresponding to the motion change. When the terminal apparatus 100 operates in the voice control mode, the controller 170 may analyze the user voice which is input through the microphone unit 150, and operate in the voice recognition mode where a control operation is performed according to the analyzed user voice.

The motion sensor 165 may sense a motion of a body of the terminal apparatus 100. For example, the terminal apparatus 100 may be rotated or tilted in various directions. In this case, the motion sensor 165 may sense motion characteristics such as a direction, an angle, and a slope of the rotation or tilting of the terminal apparatus 100. In an exemplary embodiment, the motion sensor 165 may include at least one from among a geomagnetic sensor, a gyro sensor, and an acceleration sensor.

In addition, although not shown in FIG. 2, the terminal apparatus 100 may further include a universal serial bus (USB) port which is connected to a USB connector, various external input ports which are connected to various external devices such as a headset, a mouse, a local area network (LAN), a digital multimedia broadcasting (DMB) chip which receives and processes a DMB signal, and various sensors.

Names of the above-described elements of the terminal apparatus 100 may be changed according to exemplary embodiments. Also, the terminal apparatus 100 may be configured with at least one from among the above-described elements, and some of the elements may be omitted, or another element may be further included in the terminal apparatus 100.

Figure 3:
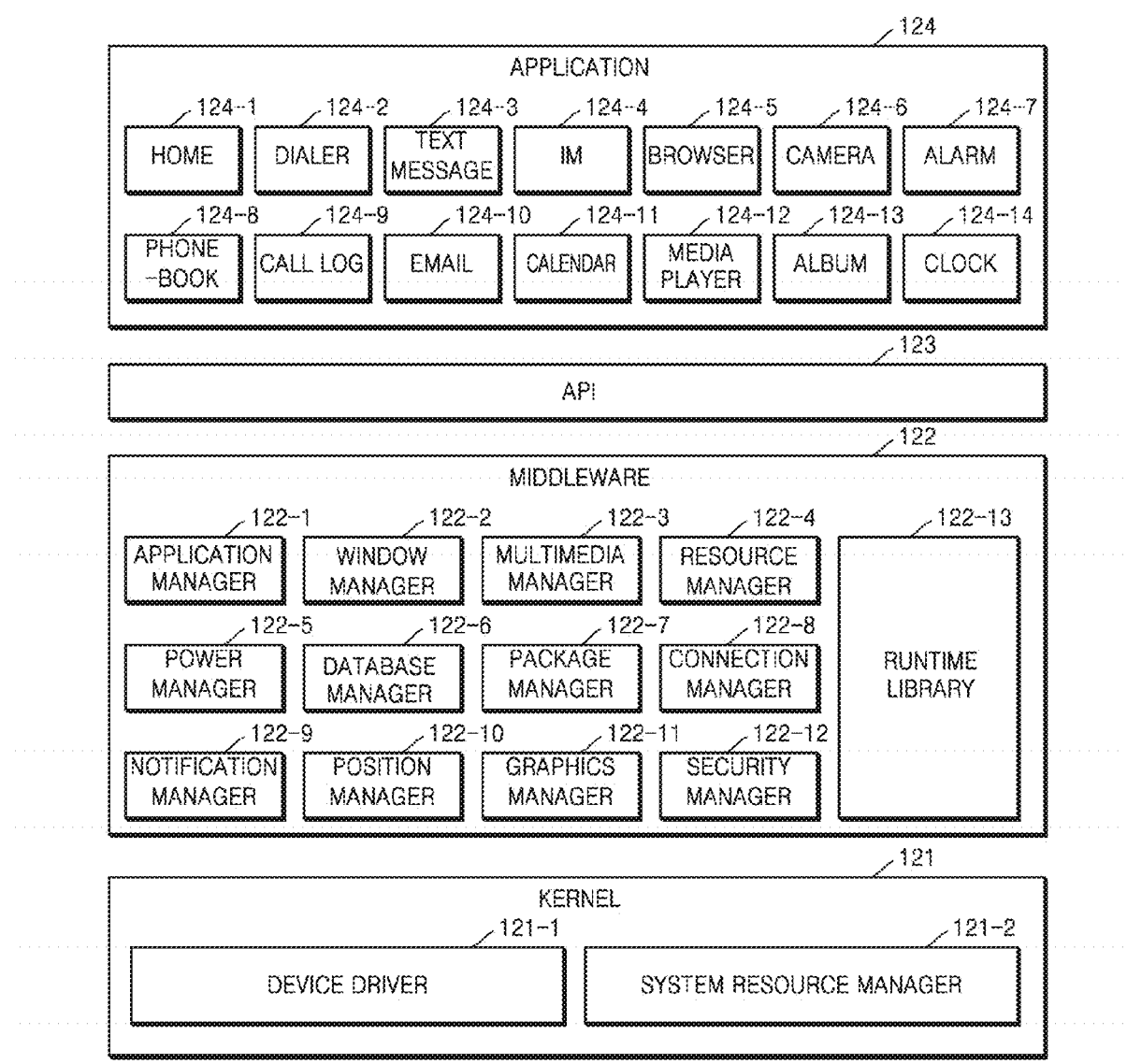
FIG. 3 is a block diagram illustrating a software configuration of a terminal apparatus according to an exemplary embodiment.

FIG. 3 is a block diagram illustrating a software configuration of a terminal apparatus according to an exemplary embodiment.

Referring to FIGS. 2 and 3, the memory 120 may store an application program for operations of an OS and an application which controls resources of the terminal apparatus 100. The OS may include a kernel, middleware, and an application program interface (API). Examples of the OS may include, but not limited thereto, Android, iOS, Windows, Symbian, Tizen, and Bada.

The kernel 121 may include at least one from among a device driver 121-1 and a system resource manager 121-2 which manage the resources of the terminal apparatus 100. The device driver 121-1 may access and control hardware elements of the terminal apparatus 100 in a software manner. To this end, the device driver 121-1 may be divided into an interface and a separate driver module which is provided by a hardware manufacturer. The device driver 121-1, for example, may include at least one from among a display driver, a camera driver, a Bluetooth driver, a sharing memory driver, a USB driver, a keypad driver, a Wi-Fi driver, an audio driver, and an inter-process communication (IPC) driver. The system resource manager 121-2 may include at least one from among a process managing unit, a memory managing unit, and a file system managing unit. The system resource manager 121-2 may control, allocate, and collect a system resource.

The middleware 122 may include a plurality of modules which are implemented for providing a function to be used in various applications. The middleware 122 may provide the function through an API 123 in order for an application 124 to efficiently use internal resources of the terminal apparatus 100. The middleware 122, for example, may include at least one from among a plurality of modules such as an application manager 122-1, a window manager 122-2, a multimedia manager 122-3, a resource manager 122-4, a power manager 122-5, a database manager 122-6, a package manager 122-7, a connection manager 122-8, a notification manager 122-9, a position manager 122-10, a graphics manager 122-11, and a security manager 122-12.

The application manager 122-1 may manage a life cycle of at least one from among a plurality of the applications 124. The window manager 122-2 may manage a graphical user interface (GUI) resource used in a screen. The multimedia manager 122-3 may determine a format for reproducing various media files, and perform encoding or decoding of a media file by using a codec suitable for the format. The resource manager 122-4 may manage a resource such as a source code, a memory, or a storage space of at least one from among the plurality of applications 124. The power manager 122-5 may operate along with a basic input/output system (BIOS) to manage a battery or power, and provide power information about an operation. The database manager 122-6 may perform management to generate, search, or change a database which is used in at least one from among the plurality of applications 124. The package manager 122-7 may manage an installation or updating of an application which is distributed in the form of a package file. The connection manager 122-8, for example, may manage a wireless connection such as Wi-Fi or Bluetooth. The notification manager 122-9 may display or notify the user about an event, such as an incoming message, an appointment, or a proximity notification. The position manager 122-10 may manage position information of the terminal apparatus 100. The graphics manager 122-11 may manage a graphics effect, which is to be provided to the user, and a user interface associated with the graphics effect. The security manager 122-1 may provide a bearing security function which is required for system security or user authentication. When the terminal apparatus 100 includes a phone function, the middleware 122 may further include a call manager (not shown) for managing a user's voice or video call.

The middleware 122 may further include a runtime library 122-13 or other library modules (not shown). The runtime library 122-13 is a library module which is used by a compiler for adding a new function by using a programming language while an application is being executed. For example, the runtime library 122-13 may perform a function for an input/output, memory management, or an arithmetic function. The middleware 122 may combine various functions of the above-described internal element modules to generate a new middleware module, and use the new middleware module. The middleware 122 may provide a module corresponding to a kind of an OS and thus provide a differentiated function. The middleware 122 may dynamically delete some of the existing elements, or add new elements. Some of the above-described elements according to the present embodiment may be omitted, another element may be further added, or some elements may be replaced by an element which performs a similar function and has a different name.

The API 123 is a set of API programming functions, and may be provided as a different element depending on an OS. In the case of Android or iOS, for example, one API set may be provided for each platform. In the case of Tizen, for example, two or more API sets may be provided.

The application 124 may include a preloaded application, which is installed as a default, or a third party application which is installed by a user to be used. The application 124, for example, may include at least one from among a home application 124-1 for returning to a home screen, a dialer application 124-2 for dialing a phone number of a third party, a text message application 124-3 for receiving a message from a third party identified by a phone number, an instant message (IM) application 124-4, a browser application 124-5, a camera application 124-6, an alarm application 124-7, a phone-book application 124-8 for managing phone numbers or addresses of third parties, a call log application 124-9 for managing a call log of a user, a receiving/sending log of a text message, or a missed call log, an email application 124-10 for receiving a message from a third party identified by an email, a calendar application 124-11, a media player application 124-12, an album application 124-13, and a clock application 124-14.

Names of the above-described elements according to an exemplary embodiment may be changed depending on kinds of OSs. Also, software elements according to an exemplary embodiment may include at least one or more of the above-described elements, or may further include another element. Alternatively, some of the above-described elements may be omitted.

Figure 4:
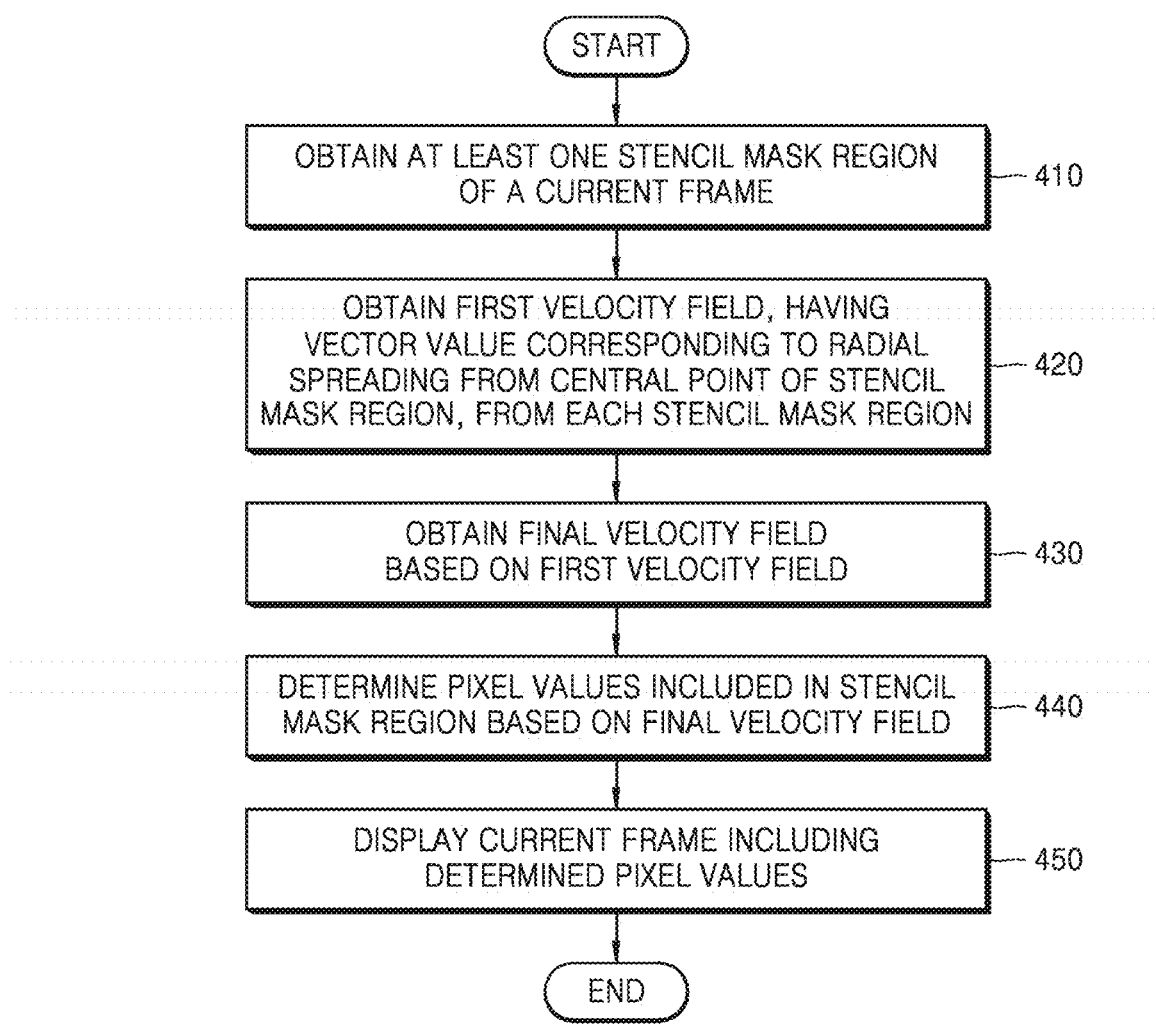
FIG. 4 is a flowchart illustrating an image processing method according to an exemplary embodiment.

FIG. 4 is a flowchart illustrating an image processing method according to an exemplary embodiment.

Referring to FIG. 4, in operation 410, the terminal apparatus 100 may obtain at least one stencil mask region of a current frame of an image. The stencil mask region may be generated according to an input signal, and when a reference time passes, the stencil mask region may be dissipated. According to an exemplary embodiment, a size of the stencil mask region may be increasingly enlarged with the passing of time, and thus, the image may be displayed such that an application range of the watercolor effect is increasingly expanded according to a user input. The terminal apparatus 100 may obtain the stencil mask region, which is generated by the input signal, or a stencil mask region which is generated in a previous frame and is not yet dissipated.

In operation 420, the terminal apparatus 100 may obtain a first velocity field, having a vector value corresponding to a radial spreading from a central point of the stencil mask region, from the stencil mask region which is obtained in operation 410. The central point of the stencil mask region may correspond to a point at which the user input is input. A velocity field indicates a direction, in which a particle moves from each point, and a size of the particle. According to an exemplary embodiment, the first velocity field may include radial vectors from the central point of the stencil mask region.

In operation 430, the terminal apparatus 100 may obtain a final velocity field which is to be applied to the stencil mask region, based on the first velocity field which is obtained in operation 420. When there is another velocity field, which is to be applied to the stencil mask region, in addition to the first velocity field, the terminal apparatus 100 may obtain the final velocity field by using the first velocity field and the other velocity field. For example, the terminal apparatus 100 may obtain the final velocity field by using a second velocity field, which indicates a fluid characteristic such as volute flow or turbulent flow, in addition to the first velocity field.

In operation 440, the terminal apparatus 100 may determine pixel values included in the stencil mask region based on the final velocity field which is obtained in operation 430.

When the final velocity field is a grid-based velocity field, the final velocity field may have velocity information (i.e., a moving direction and size information of a particle) of the particle per basic point of each grid. When a pixel value is determined according to the final velocity field based on a grid, a hole may occur because a pixel value is not determined for some grid points. That is, when some grid points are not determined as moved positions of particles, a hole may occur.

The terminal apparatus 100 according to an exemplary embodiment may determine a pixel value according to a semi-Lagrangian technique, and thus determine the pixel value such that a hole may not occur. For example, the terminal apparatus 100 may determine a pixel value for a grid point, in which a hole may occur, according to the semi-Lagrangian technique.

The semi-Lagrangian technique is a technique that determines a pixel value based on a principle that a physical quantity of fluid at a current position is the same as a physical quantity at a previous position when fluid of a unit volume travels at a current velocity of the fluid. According to the semi-Lagrangian technique, a current pixel value may be determined as a pixel value at a previous position from which a current pixel travels according to a final velocity field. The terminal apparatus 100 may determine a pixel value included in each stencil mask region by using a final velocity field according to the semi-Lagrangian technique.

In operation 450, the terminal apparatus 100 may display a current frame including the pixel values which are determined in operation 440.

Hereinafter, the above-described stencil mask region and semi-Lagrangian technique will be described in detail with reference to FIGS. 5 and 6.

Figure 5:
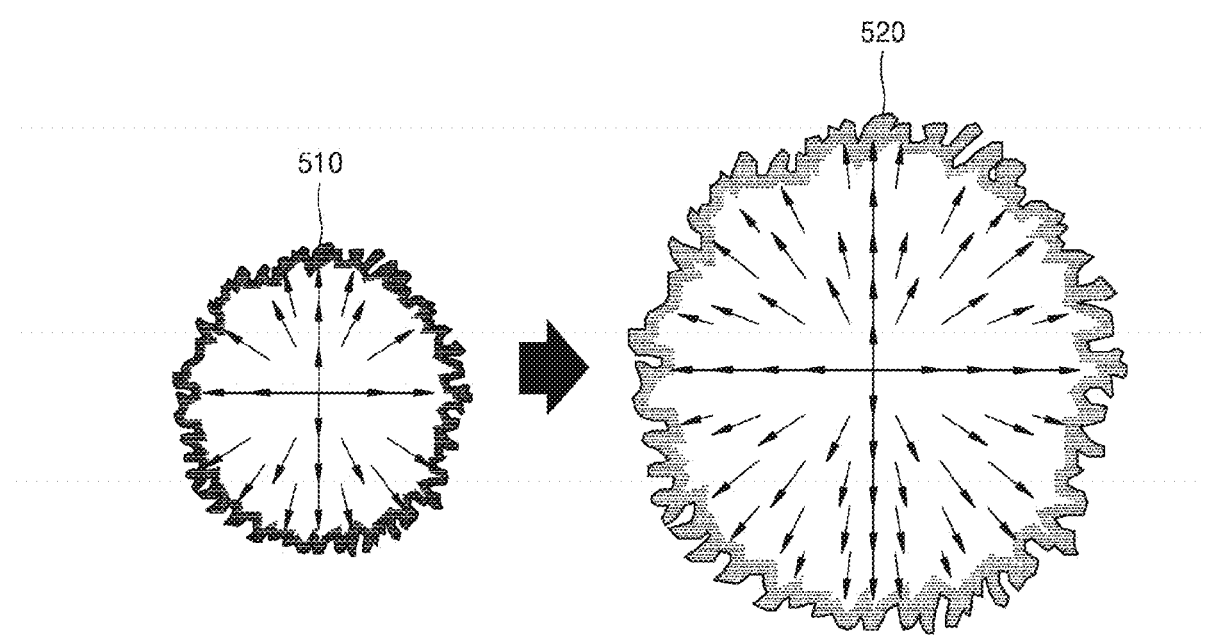
FIG. 5 is an exemplary diagram illustrating an example of a stencil mask region according to an exemplary embodiment.

FIG. 5 is an exemplary diagram illustrating an example of a stencil mask region according to an exemplary embodiment.

Referring to FIG. 5, stencil mask regions 510 and 520 and a first velocity field of each of the stencil mask regions 510 and 520 are illustrated.

A size of each of the stencil mask regions 510 and 520, as illustrated in FIG. 5, may be increasingly enlarged as time passes, to realize an effect in which watercolors are circularly spread from a point at which a user input is received. The first velocity field of each of the stencil mask regions 510 and 520 may include radial vectors from a central point of a stencil mask region. The first velocity field and the stencil mask regions 510 and 520 may be generated according to the user input, and the first velocity field allows particles to be shown as if radially flowing according to the user input.

The terminal apparatus 100 may set, as a stencil mask region, a region in which paints spread. In particular, the stencil mask region is used to simulate watercolor, which covers an already displayed image and circularly spreads toward a periphery of a point at which the user input is received. A size of the set stencil mask region may be changed as time passes, and the terminal apparatus 100 may perform image processing for applying a visual effect to only the stencil mask region.

A boundary of the stencil mask regions 510 and 520, as illustrated in FIG. 5, may have an irregular form to realize a natural watercolor effect, and a border may be displayed as darker than an internal region of a circle. In this manner, a stencil mask region to which a visual effect is applied may be easily distinguished.

The terminal apparatus 500 may load a pre-stored image file, having substantially the same shape as that of the stencil mask region illustrated in FIG. 5, at a time when the user input is received, and may set a stencil mask region with respect to a point at which the user input is received on a screen, by using the loaded image file.

Figure 6:
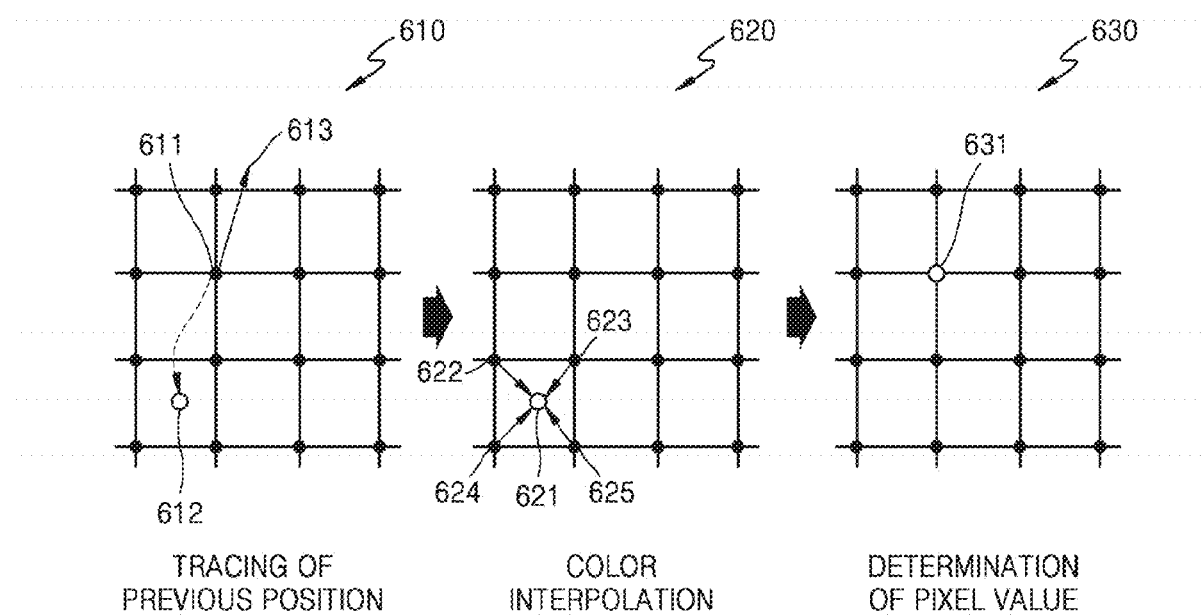
FIG. 6 is an exemplary diagram illustrating an example of determining a pixel value by using a semi-Lagrangian technique, according to an exemplary embodiment.

FIG. 6 is an exemplary diagram illustrating an example of determining a pixel value by using the semi-Lagrangian technique, according to an exemplary embodiment.

Referring to FIG. 6, in an operation 610 of tracing a previous position, to determine a pixel value of a current pixel 611, the terminal apparatus 100 may obtain a position 612 at a previous frame by using a velocity value 613 based on a final velocity field for the current pixel 611. That is, the terminal apparatus 100 may obtain the position 612 at a previous frame of the current pixel 611 when the current pixel 611 travels according to the velocity value 613.

In an operation 620 of interpolating a color of a previous position, when it is not possible to determine a pixel value 621 of a previous position 612, the terminal apparatus 100 may obtain the pixel value 621 of the previous position by using peripheral pixel values 622 to 625. The pixel value 621 of the previous position 612 of a current pixel 611 may be a pixel value at a previous frame of the current pixel 611 included in a previous frame. The terminal apparatus 100 may calculate the pixel value 621 of the previous position 612 by using a value, in which a weight value is applied to a pixel value of each of peripheral pixels 622 to 625, according to a distance between the peripheral pixels 622 and 625 and a pixel of the previous position 612.

In an operation 630 of determining a current pixel value, the terminal apparatus 100 may determine a current pixel value 631 as the pixel value 621 of the previous position 612 which is calculated in the operation 620.

A pixel value of a current pixel may be obtained by using the following Equation (1). Equation (1) corresponds to a continuity equation, indicating that a pixel value of a current pixel is the same as a pixel value of a previous position according to the law of conservation of mass in fluid dynamics.

$$\frac{\partial \text{Color}}{\partial t} = -n \cdot \nabla \text{Color} \quad (1)$$

Figure 7:
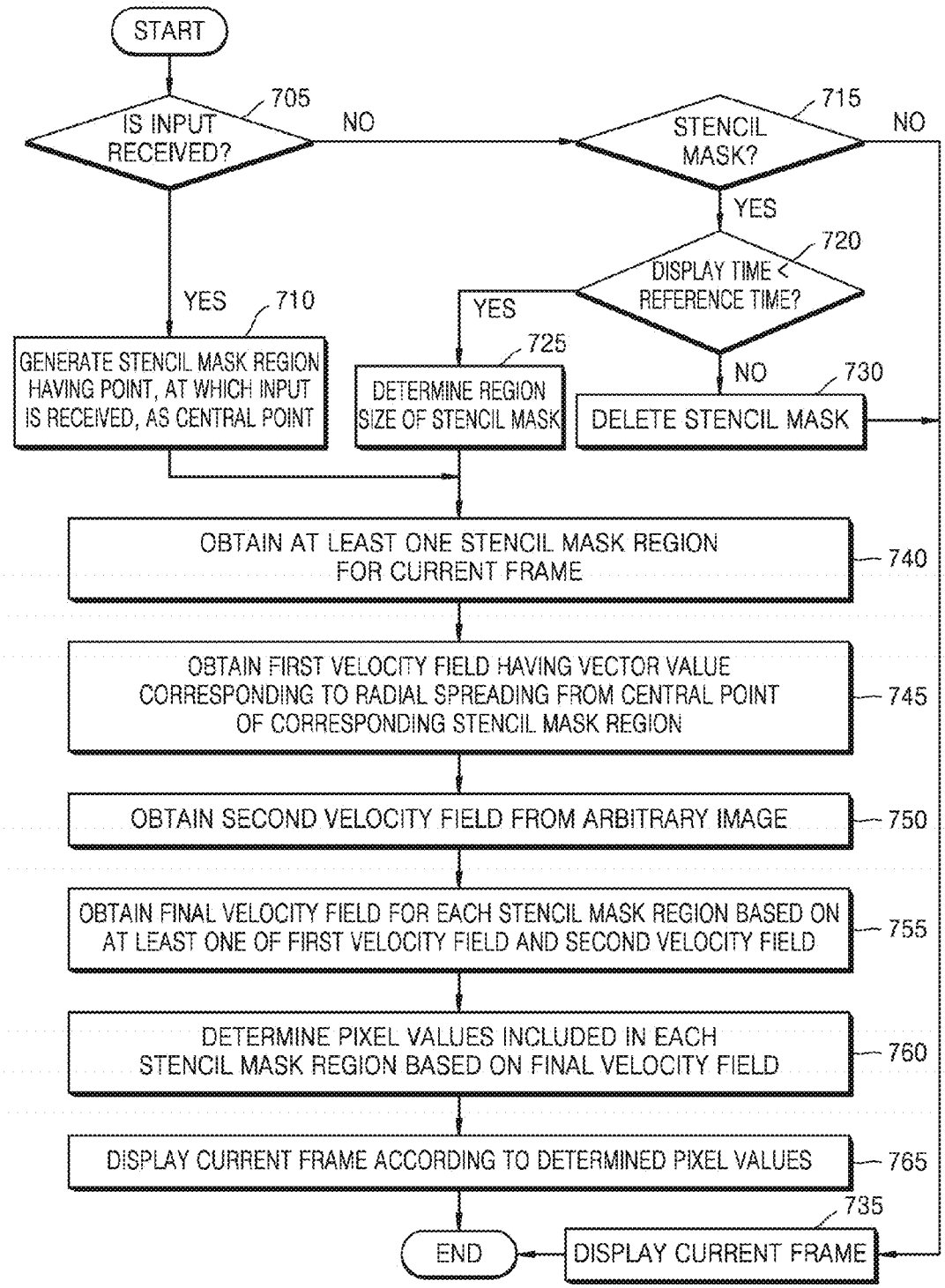
FIG. 7 is a flowchart illustrating an image processing method based on an input signal according to an exemplary embodiment.

FIG. 7 is a flowchart illustrating an image processing method based on an input signal according to an exemplary embodiment.

Referring to FIG. 7, when the terminal apparatus 100 receives an input in operation 705, the terminal apparatus 100 may generate a stencil mask region of a current frame having a point at which the input is received in operation 705 as a central point in operation 710. That is, the terminal apparatus 100 may determine a stencil mask region according to a user input, and determine a region to which the watercolor effect is to be applied.

When the user input is received on a screen multiple times, a stencil mask may be generated at each location the user input is received. The terminal apparatus 100 may allocate a memory (i.e., a frame buffer object) having a size substantially equal to a size of an image, which is displayed on the terminal apparatus 100 only once, and record at least one stencil mask region in the allocated memory. When a plurality of stencil mask regions are recorded in the memory, the controller 170 of the terminal apparatus 100 controls such that the plurality of stencil mask regions do not overlap one another.

When an input for the current frame is not received in operation 705, the terminal apparatus 100 may determine whether there is a stencil mask in operation 715. A stencil mask, which exists during processing of the current frame, may be generated in a previous frame according to an input signal received at the previous frame and is not yet dissipated.

In operation 720, the terminal apparatus 100 may determine whether a display time of a currently existing stencil mask is shorter than a reference time. The display time of stencil mask includes a difference value between a current time point and a time point at which the stencil mask is generated. When the display time is equal to or longer than the reference time at the current time point, the terminal apparatus 100 may determine that a service life of the stencil mask is ended, and delete the stencil mask in operation 730. The display time may denote a time for which the stencil mask is displayed in the terminal apparatus 100, namely, a time for which pixels (to which the watercolor effect is applied) included in a stencil mask region are displayed. The display time or the reference time may be determined as a certain number of frames or a certain time unit.

When it is determined in operation 715 that there is no stencil mask or there is no stencil mask for the current frame because all stencil masks are deleted in operation 730, the terminal apparatus 100 may proceed to operation 735. In operation 735, since there is no stencil mask to which the watercolor effect is applied, the terminal apparatus 100 may display the current frame to which the watercolor effect is not applied.

In operation 720, when the display time of the stencil mask is shorter than the reference time, the terminal apparatus 100 may determine a region size of the stencil mask in operation 725. The region size of the stencil mask may be determined according to the display time. For example, when the display time becomes longer, the region size of the stencil mask may be increasingly enlarged.

The region size of the stencil mask may be changed at every frame, and thus, the terminal apparatus 100 may erase a stencil mask image stored in a memory, i.e., a frame buffer object, and record a stencil mask region image, scaled to the size which is determined in operation 725, in the memory.

In operation 740, the terminal apparatus 100 may obtain at least one stencil mask region for the current frame. The terminal apparatus 100 may load a stencil mask region image for the current frame from the memory to obtain at least one stencil mask region. The stencil mask region, which is obtained in operation 740, may include at least one from among the stencil mask region, which is generated in operation 710, and the stencil mask region whose size is determined in operation 725. The at least one stencil mask region, which is obtained in operation 740, may be separately processed in an operation subsequent to operation 740, and may be displayed in the current frame.

In operation 745, with respect to each stencil mask region, the terminal apparatus 100 may obtain a first velocity field having a vector value corresponding to a radial spreading from a central point of a corresponding stencil mask region.

In operation 750, the terminal apparatus 100 may obtain a second velocity field from an arbitrary image. The second velocity field may have a vector value for expressing volute flow and turbulent flow, and the arbitrary image may be a noise image such as Perlin noise and Gaussian noise. The second velocity field may be applied to the at least one stencil mask region which is obtained in operation 740. A method of obtaining the second velocity field will be described below in detail with reference to FIG. 8.

In operation 755, the terminal apparatus 100 may obtain a final velocity field for each stencil mask region based on at least one from among the first velocity field, which is obtained in operation 745, and the second velocity field, which is obtained in operation 750. The final velocity field, for example, may be obtained by performing an arithmetic operation of summing the first and second velocity fields. A method of obtaining the final velocity field is not limited thereto, and may be changed according to exemplary embodiments.

Velocity vectors of grid points, included in the final velocity field, in each stencil mask region may be used to obtain a pixel value in a next frame. In this case, the terminal apparatus 100 may store velocity vector values in each pixel of an image, and transfer the velocity vector values to hardware which processes the next frame. In an exemplary embodiment, a total of four channels (i.e., red (R), green (G), blue (B), and alpha (A)) for transferring information about each pixel of the image may be provided. In this case, the R channel may store an x direction velocity of a pixel, the G channel may store a y direction velocity of the pixel, the B channel may store accumulation time information in which a visual effect is applied to the pixel, and the A channel may store an alpha value indicating whether the visual effect is applied to the pixel.

In operation 760, the terminal apparatus 100 may determine pixel values included in each stencil mask region based on the final velocity field which is obtained in operation 755. The terminal apparatus 100 may determine the pixel values from the final velocity field according to the above-described semi-Lagrangian technique. For example, the alpha value being greater than 0 may denote a pixel which is included in a stencil mask region and for which a visual effect processing is performed, and thus, the terminal apparatus 100 may determine a pixel value for only a pixel in which the alpha value stored in the A channel is greater than 0 based on the final velocity field.

The terminal apparatus 100 may use a pixel value of a previous frame, which is determined through advection according to the final velocity field, in obtaining a pixel value of a next frame to maintain an effect of a spreading fluid for a predetermined time period (e.g., several seconds) even after a user input is received. A ping-pong technique may be used such that data is synchronized and transferred between a memory which stores a previously determined pixel value and a memory which stores a pixel value which is determined at a current time. Thus, pixel values of a previous frame may be used in a subsequent operation. According to the ping-pong technique, the memory storing a previously determined pixel value and the memory storing a pixel value which is determined at a current time may be swapped at every frame, and thus, may store data. According to the ping-pong technique, the terminal apparatus 100 may determine a pixel value of a subsequent frame by using a pixel value of a previous frame, and store the determined pixel value in a memory storing the pixel value of the previous frame and as well as in a memory storing the pixel value currently determined. Therefore, a previously determined pixel value and a currently determined pixel value are stored in the same memory, thereby preventing an error from occurring.

In operation 765, the terminal apparatus 100 may display a current frame, including the pixel values which are determined in operation 760, on the display 120. When synthesizing and displaying one or more stencil mask regions and the other region, the terminal apparatus 120 may change at least one value from among chroma and brightness of pixel values, which are determined in operation 760, to be visually and naturally shown. In addition, a border of the stencil mask region may be processed to be blurred. For example, the terminal apparatus 100 may determine pixel values of the stencil mask region having higher chroma and brightness than those of the other region, and display an image in order for the stencil mask region to be visually and naturally connected to the other region.

Figure 8:
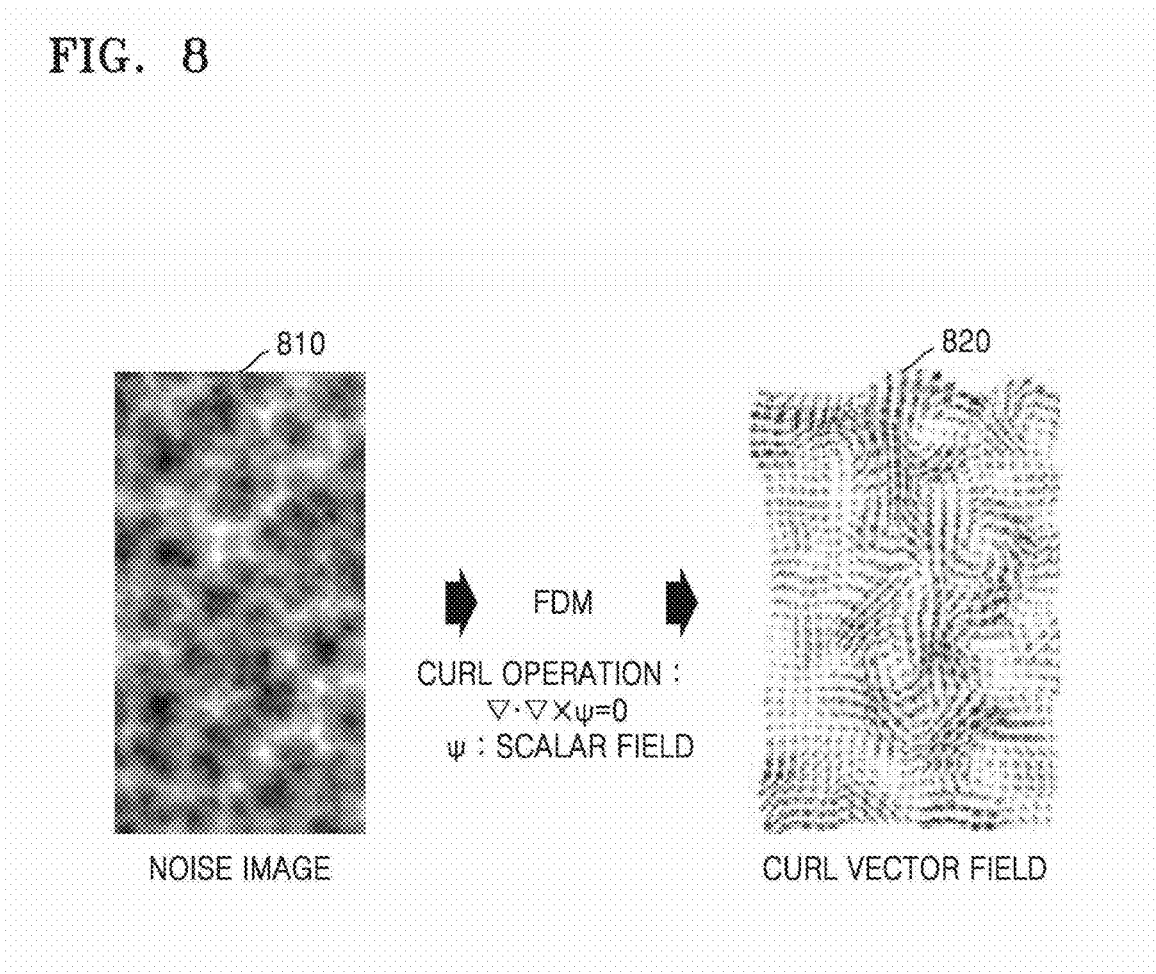
FIG. 8 is an exemplary diagram illustrating an example of obtaining a second velocity field, according to an exemplary embodiment.

FIG. 8 is an exemplary diagram illustrating an example of obtaining a second velocity field, according to an exemplary embodiment.

Referring to FIG. 8, the terminal apparatus 100 may obtain a second velocity field 820 from a noise image 810. The terminal apparatus 100 may use, as a scalar field, the noise image 810 as an average value of one channel or each channel of the noise image 810. The terminal apparatus 100 may perform a curl operation on a scalar field to obtain a vector field which indicates a direction and a magnitude of a rotation amount in a looped curve. The vector field obtained from the noise image 810 may be shown as the second velocity 820 of FIG. 8 which includes eddies similar to a form of the noise image 810. In addition, the second velocity field 820 may include vector values in a grid velocity field according to a finite differential method (FDM).

A curl operation illustrated in FIG. 8 may be expressed as the following Equation (2) because a divergence of a curl becomes zero by applying divergence to "$\nabla \times \Psi$", which denotes the curl operation.

$$\nabla \cdot \nabla \times \Psi = 0$$

$\Psi$: scalar field (2)

The second velocity field 820 obtained through the curl operation satisfies incompressibility that is a characteristic of fluid. In a case where incompressibility is expressed as an equation, $\nabla \cdot (\text{vector}) = 0$, and in Equation (2), "$\nabla \times \Psi$" is a vector value which is obtained through the curl operation. Therefore, the curl operation may correspond to an equation indicating incompressibility, and thus, the second velocity field 820 obtained through the curl operation may satisfy incompressibility.

Therefore, a vector field which is obtained by performing the curl operation on an arbitrary image satisfies incompressibility that is a characteristic of fluid, and thus may be used as a velocity field for expressing a flow of fluid.

Figure 9:
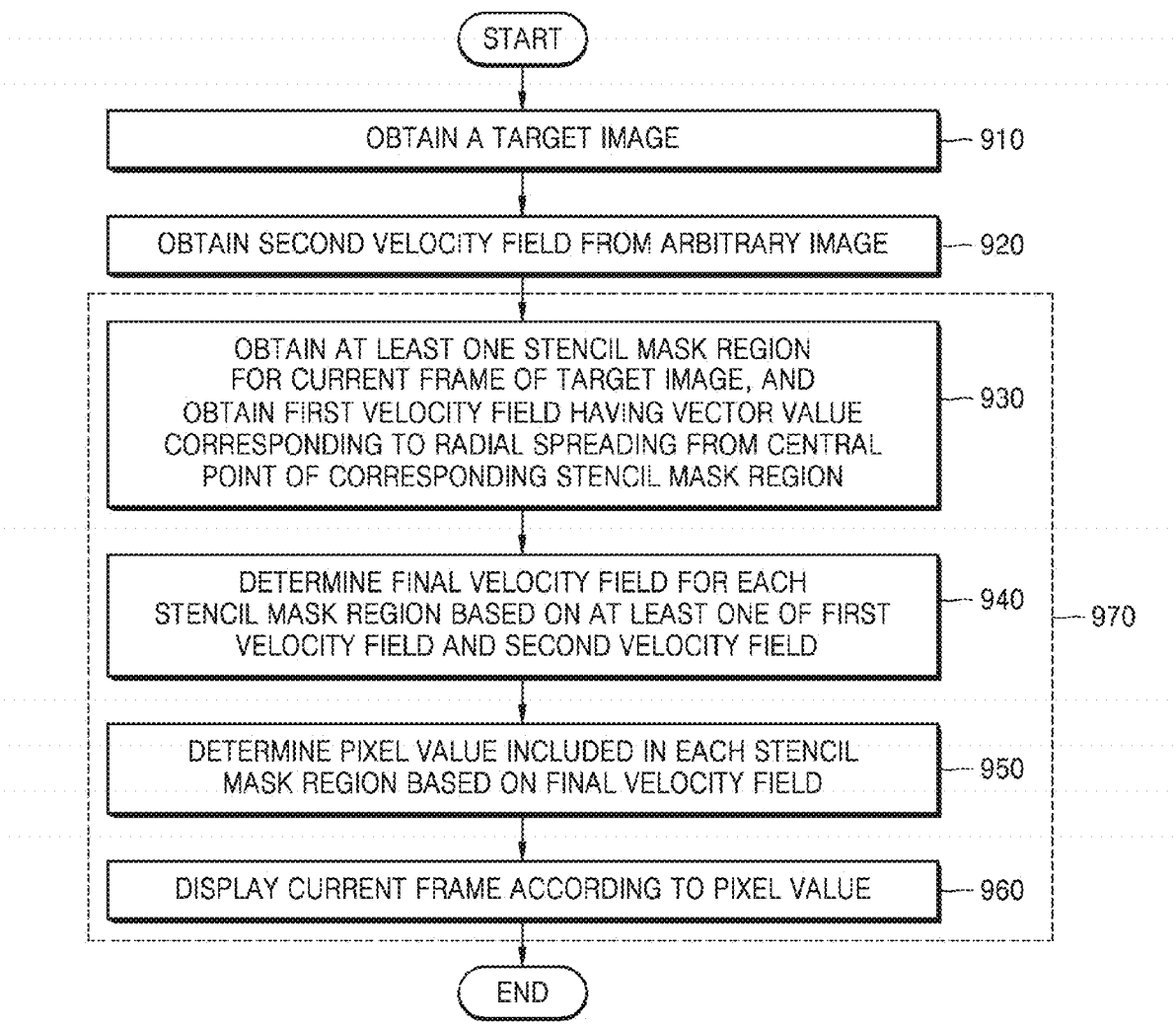
FIG. 9 is a flowchart illustrating an image processing method according to an exemplary embodiment.

FIG. 9 is a flowchart illustrating an image processing method according to an exemplary embodiment. In FIG. 9, an operation which is repeated at every frame is distinguished from an operation which is not repeated at every frame, as compared to the exemplary embodiments shown in FIGS. 4 and 7.

Referring to FIG. 9, in operation 910, the terminal apparatus 100 may obtain an image to be processed. The image, which is obtained in operation 910, may be an image to which the watercolor effect is to be applied according to an input signal.

In operation 920, the terminal apparatus 100 may obtain a second velocity field from an arbitrary image. The second velocity field may be a vector field which is obtained by performing a curl operation on the arbitrary image. The second velocity field may be obtained from the arbitrary image, and thus may not be changed with the passing of time. Therefore, the second velocity field may be obtained when image processing starts, and the obtained second velocity field may be used when the image processing is performed at every frame.

Operations 910 and 920 may not be repeated at every frame. Operations 910 and 920 may be performed before operation 930 and operations 940, 950, and 960 subsequent to operation 930 are performed, and may not again be performed to reduce a load applied to the terminal apparatus 100. However, exemplary embodiments are not limited thereto, and for example, operations 910 and 920 may be repeated according to a user input or a setting, or may be performed during performing image processing.

In operation 970 including operations 930, 940, 950 and 960, the terminal apparatus 100 may perform an image processing operation on a current frame, which is displayed at a current time, for a target image which is obtained in operation

910. Operation 970 including operation 930 and operations 940, 950, and 960 subsequent to operation 930 may be repeated at every frame.

In operation 930, the terminal apparatus 100 may obtain at least one stencil mask region for the current frame, and obtain a first velocity field having a vector value corresponding to a radial spreading from a central point of a corresponding stencil mask region in each stencil mask region.

In operation 940, the terminal apparatus 100 may determine a final velocity field for each stencil mask region based on at least one from among the first velocity field, (which is obtained in operation 920, and the second velocity field, which is obtained in operation 930.

In operation 950, the terminal apparatus 100 may determine a pixel value included in each stencil mask region based on the final velocity field which is determined in operation 940. The terminal apparatus 100, as described above, may determine pixel values by using the final velocity field according to the semi-Lagrangian technique.

In operation 960, the terminal apparatus 100 may display a current frame in the display 120 according to the pixel value which is determined in operation 950.

Figure 10:
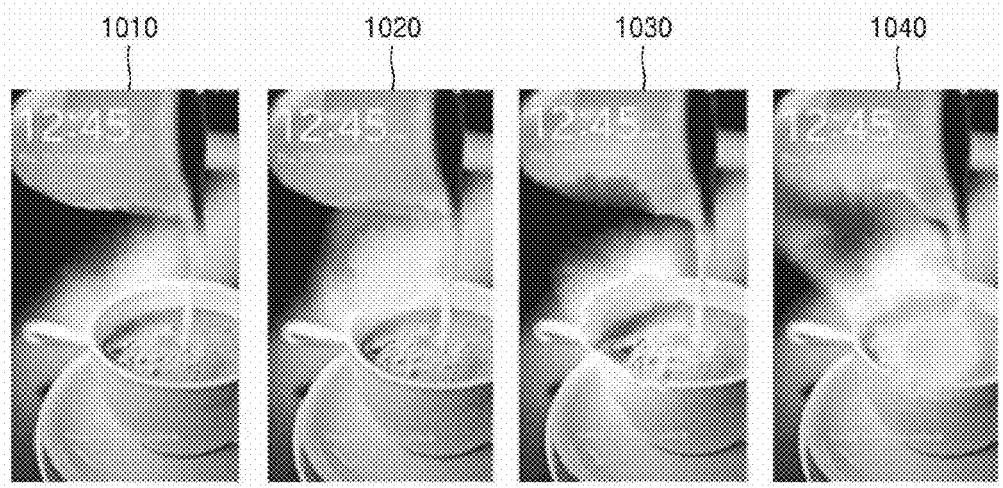
FIG. 10 is an exemplary diagram illustrating an example of an image displayed by using an image processing method according to an exemplary embodiment.

FIG. 10 is an exemplary diagram illustrating an example of an image displayed by using an image processing method according to an exemplary embodiment.

Referring to images 1010 to 1040, an image region to which the watercolor effect is applied with the passing of time may be displayed in a direction according to a user input. In this exemplary embodiment, the watercolor effect is applied in a right lower direction.

As described above, according to one or more of the above exemplary embodiments, a first velocity field which is previously obtained may be used for displaying an image with the watercolor effect applied thereto, and an arithmetic operation may be performed for only a region to which the watercolor effect is to be applied, thereby reducing a memory capacity and the number of operations.

According to an exemplary embodiment, an image having no holes may be displayed by performing an advection operation on pixel values of an image according to the semi-Lagrangian technique.

The method according to an exemplary embodiment may be implemented as a code and/or instructions readable by computer and stored in a computer-readable recording medium having information processing capabilities devices. The computer-readable recording medium may include all kinds of storage devices that store data readable by a computer system. Examples of computer-readable recording device include ROM, RAM, CD-ROM, magnetic tapes, floppy disks, and optical data storage devices. Also, the computer-readable recording medium may include a computer storage medium and a communication medium. The computer storage medium includes all volatile and non-volatile media, and detachable and non-detachable media which are designed to store information including computer-readable commands, data structures, program modules or other data. The communication medium includes computer-readable commands, a data structure, a program module, and other transmission mechanisms, and includes other information transmission mediums.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. An image processing method comprising:
    obtaining at least one stencil mask region for a current frame;
    obtaining a first velocity field corresponding to a radial spreading from a central point of the at least one stencil mask region;
    obtaining a final velocity field for the at least one stencil mask region based on the first velocity field;
    determining a pixel value included in the at least one stencil mask region based on the obtained final velocity field; and
    displaying the current frame according to the determined pixel value.

2. The image processing method of claim 1, wherein the obtaining a final velocity field comprises:
    obtaining a second velocity field from a certain image; and
    obtaining the final velocity field for the at least one stencil mask region based on at least one from among the first velocity field and the second velocity field.

3. The image processing method of claim 2, wherein, the certain image is a noise image, and
    the obtaining a second velocity field comprises obtaining the second velocity field by performing a curl operation on the noise image.

4. The image processing method of claim 1, wherein the obtaining at least one stencil mask region comprises determining a size of the at least one stencil mask region according to a difference between a time when an input is received and a time when the current frame is displayed.

5. The image processing method of claim 1, wherein the determining a pixel value comprises:
    obtaining a velocity vector from the final velocity field;
    determining a pixel value of a previous position based on the obtained velocity vector; and
    determining the pixel value based on the determined pixel value of the previous position.

6. The image processing method of claim 1, wherein the obtaining at least one stencil mask region comprises:
    when a stencil mask region for a previous frame exists, obtaining a display time of the stencil mask region for the previous frame; and
    when the display time is shorter than a reference time, obtaining the stencil mask region for the previous frame as the at least one stencil mask region for the current frame.

7. The image processing method of claim 6, wherein the obtaining of at least one stencil mask region comprises erasing information about the stencil mask region for the previous frame from a memory when the display time is equal to or longer than the reference time.

8. The image processing method of claim 1, wherein the displaying of the current frame comprises:
    increasing, to a certain size or more, at least one from among chroma and brightness of the determined pixel value; and
    displaying the current frame according to the pixel value of which the at least one from among the chroma and the brightness increases.

9. A terminal apparatus comprising:
a controller configured to obtain at least one stencil mask region for a current frame, obtain a first velocity field corresponding to a radial spreading from a central point of the at least one stencil mask region, obtain a final velocity field for the at least one stencil mask region based on the first velocity field, and determine a pixel value included in the at least one stencil mask region based on the obtained final velocity field; and
a display configured to display the current frame according to the determined pixel value.

10. The terminal apparatus of claim 9, wherein the controller obtains a second velocity field from a certain image, and obtains the final velocity field for the at least one stencil mask region based on at least one from among the first velocity field and the second velocity field.

11. The terminal apparatus of claim 10, wherein,
the certain image is a noise image, and
the controller obtains the second velocity field by performing a curl operation on the noise image.

12. The terminal apparatus of claim 9, wherein the controller determines a size of the at least one stencil mask region according to a difference between a time when an input is received and a time when the current frame is displayed.

13. The terminal apparatus of claim 9, wherein the controller obtains a velocity vector from the final velocity field, determines a pixel value of a previous position based on the obtained velocity vector, and determines the pixel value based on the determined pixel value of the previous position.

14. The terminal apparatus of claim 9, wherein,
when a stencil mask region for a previous frame exists, the controller obtains a display time of the stencil mask region for the previous frame, and
when the display time is shorter than a reference time, the controller obtains the stencil mask region for the previous frame as the at least one stencil mask region for the current frame.

15. The terminal apparatus of claim 14, wherein the controller erases information about the stencil mask region for the previous frame from a memory when the display time is equal to or longer than the reference time.

16. The terminal apparatus of claim 9, wherein the display increases, to a certain size or more, at least one from among chroma and brightness of the determined pixel value, and displays the current frame according to the pixel value of which the at least one from among the chroma and the brightness increases.

17. An apparatus for processing an image, the apparatus comprising:
at least one memory operable to store program code;
at least one processor operable to read the program code and operate as instructed by the program code, wherein the program code is configured to cause the at least one processor to:
obtain a radial vector with respect to a point corresponding to a user input;
obtain a previous position of a pixel at a previous frame based on the radial vector; and
determine a pixel value of the pixel at a current frame based on a pixel value at the previous position of the pixel.

18. The apparatus of claim 17, wherein the code causes the at least one processor to obtain the previous position of the pixel based on a velocity value corresponding to the radial vector.

19. The apparatus of claim 17, wherein the code causes the at least one processor to determine the pixel value at the previous position by interpolating pixel values of peripheral pixels of the previous position.

20. The apparatus of claim 19, wherein a weight is applied to a pixel value of each of the peripheral pixels according to a distance between the peripheral pixels and the previous position.

* * * * *